INVENTOR
ROBERT F. CAHILL
BY Hans G. Hoffmeister
ATTORNEY

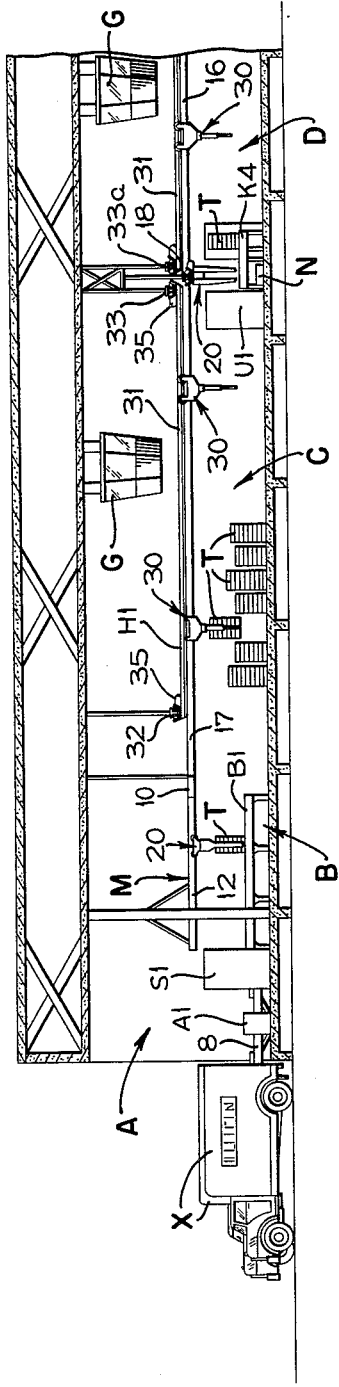
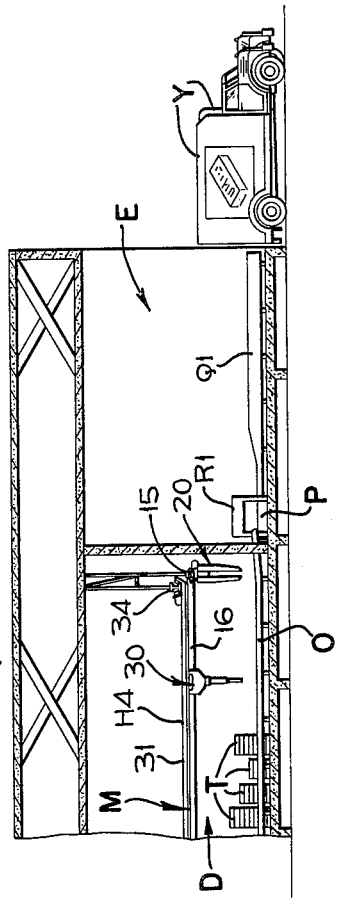

June 11, 1963 R. F. CAHILL 3,093,252
AUTOMATIC WAREHOUSE
Filed Jan. 17, 1962 8 Sheets-Sheet 4
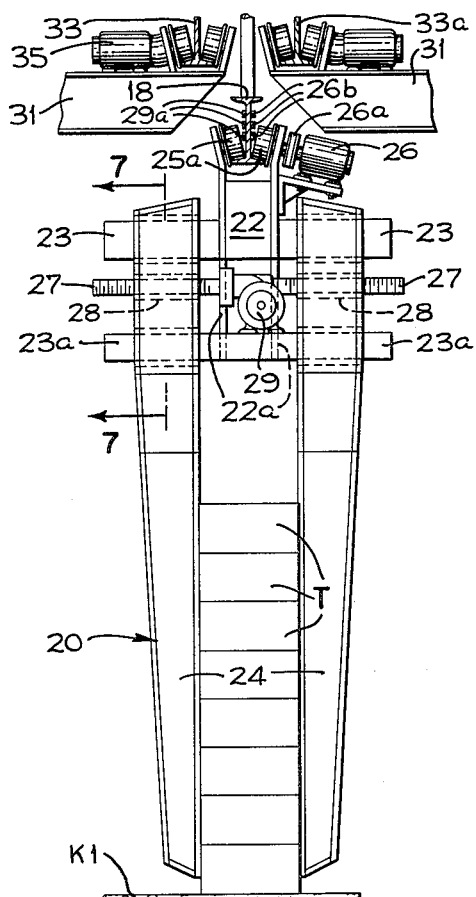
FIG_5
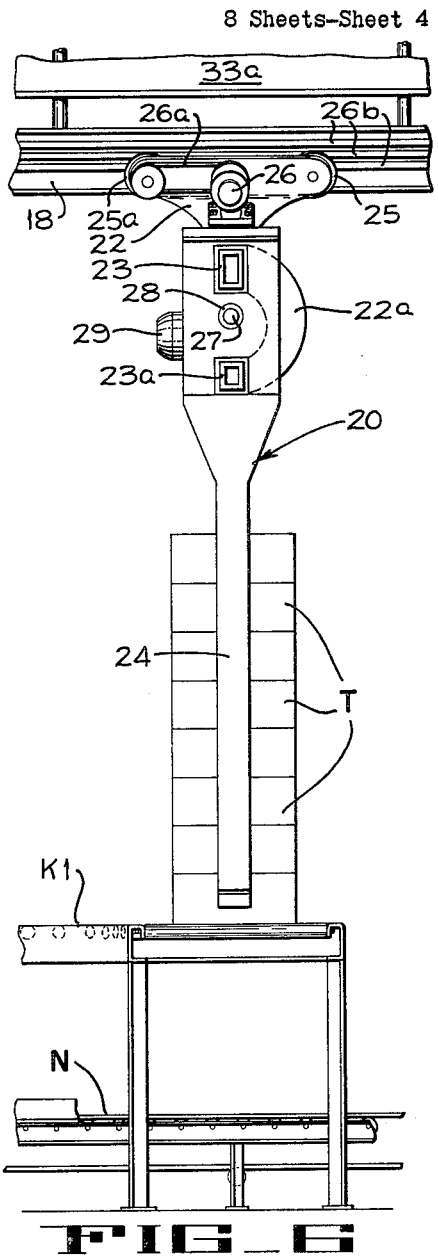
FIG_6
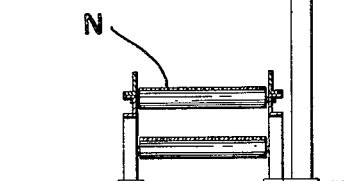
FIG_7
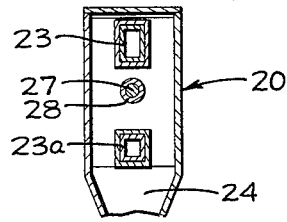
INVENTOR
ROBERT F. CAHILL
BY Hans G. Hoffmeister
ATTORNEY

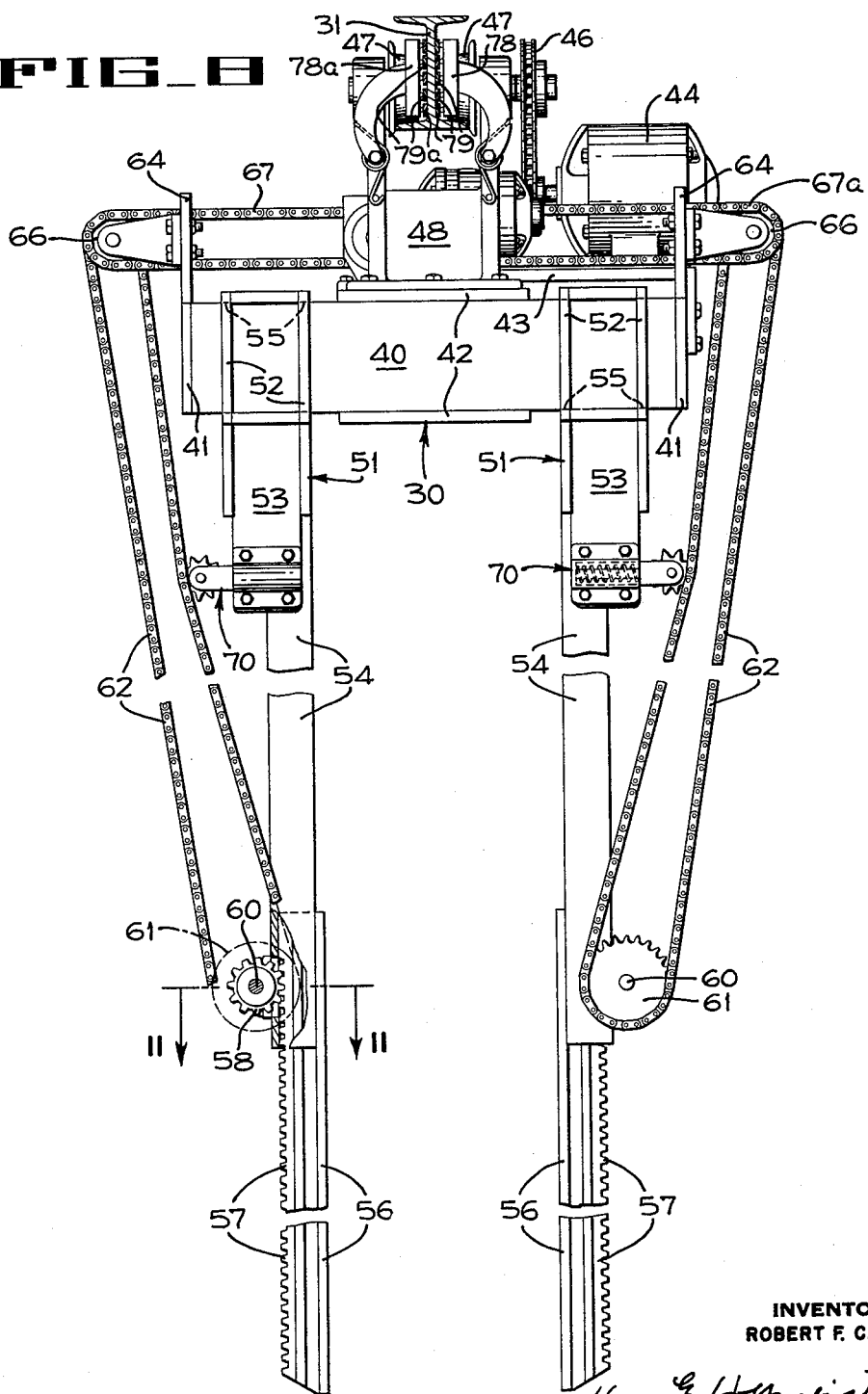

INVENTOR
ROBERT F. CAHILL
BY Hans G. Hoffmeister
ATTORNEY

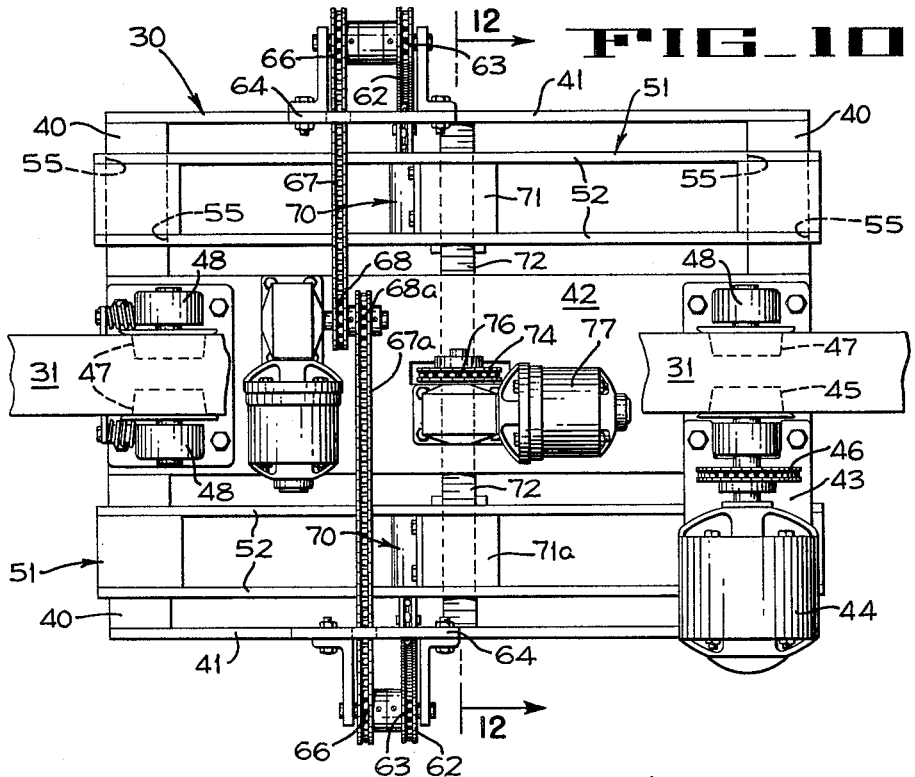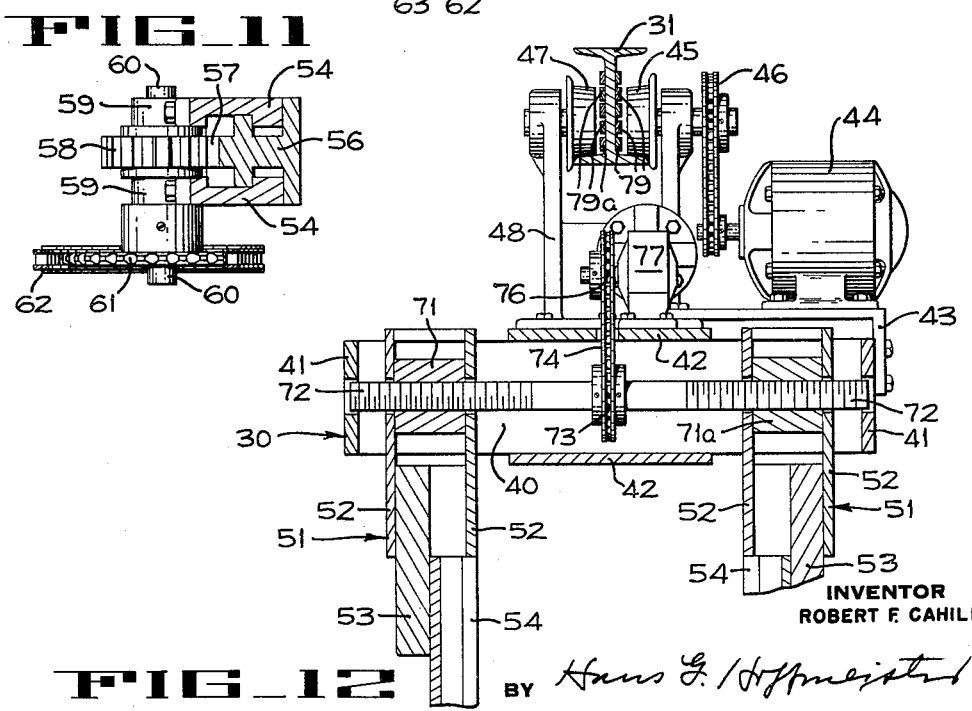

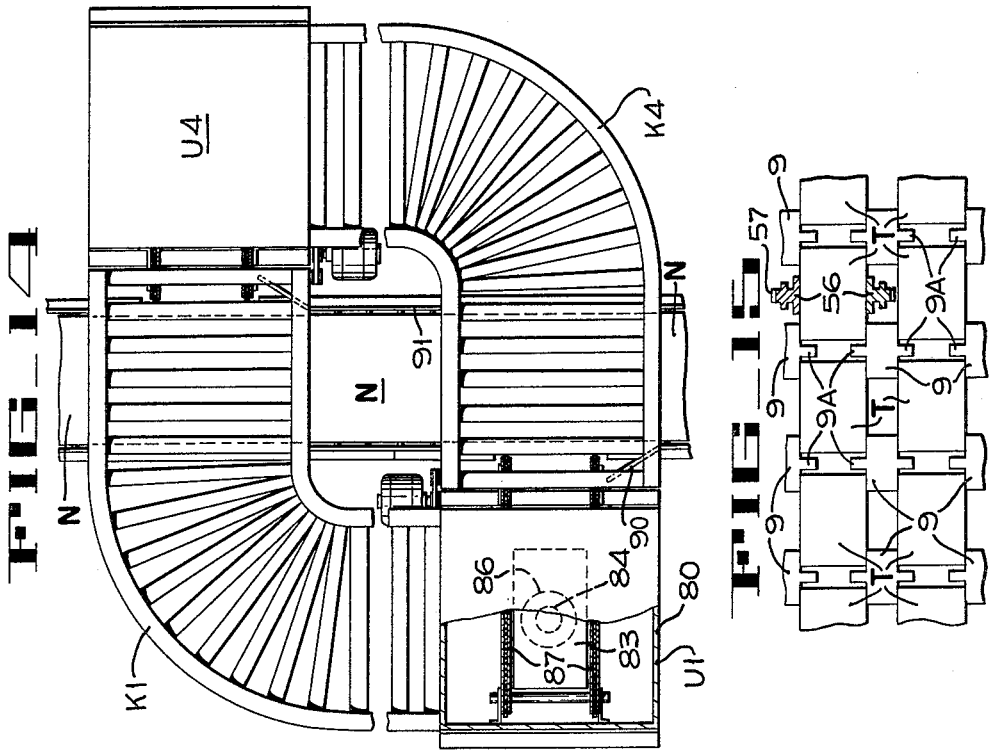
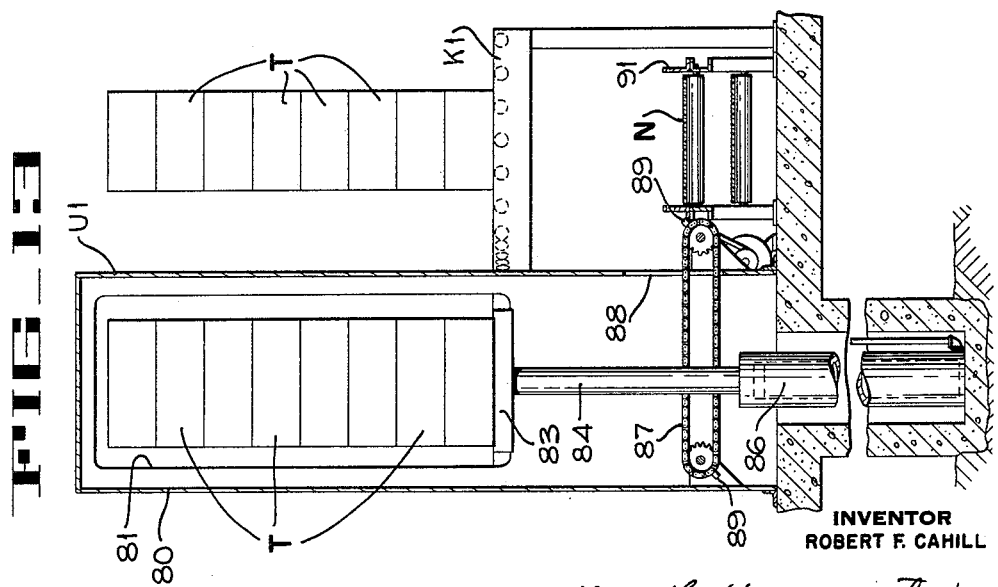

United States Patent Office 3,093,252
Patented June 11, 1963

3,093,252
AUTOMATIC WAREHOUSE
Robert F. Cahill, Los Altos, Calif., assignor to FMC Corporation, San Jose, Calif., a corporation of Delaware
Filed Jan. 17, 1962, Ser. No. 166,871
15 Claims. (Cl. 214—16)

This invention relates to a warehouse and more particularly to a system for automatically handling and storing articles such as boxes, cartons or the like that can be stacked on the floor of the warehouse.

An object of the present invention is to provide optimum utilization of floor or storage space in a warehouse. This is accomplished by delivering and removing the articles from above by means of overhead carrier equipment, thereby eliminating the need for almost all aisle space.

Another object of the invention is to provide a system that is flexible, in that storage units and the associated equipment can be added as the need therefor arises, thereby providing a modular system.

Another object of the invention is to provide a low cost automatic warehouse system.

Still another object of the invention is to provide a system of the type referred to which lends itself to automatic remote control.

Another object of the invention is to provide a storage warehouse that eliminates the need for pallets.

In accordance with the present invention the articles in storage are stacked directly on the warehouse floor, although they are guided and steadied by vertical corner posts. Such stacking of the articles eliminates the need for expensive shelving or bins and only requires the use of a suitable article carrying equipment to deposit the stacked articles in their designated storage areas and to remove them for shipment. The system can be designed so that the mobile article carriers receive full utilization, thereby minimizing the cost of the system.

Briefly, the system for handling articles in accordance with the invention is as follows:

Cartons, boxes or similar articles that can be stacked are brought into the warehouse at a receiving station whereupon they are stacked, and the stacks are deposited upon temporary storage conveyors at the receiving station. A monorail system picks up the stacks of articles from the temporary storage conveyors and deposits them on intermediate combined transfer and unloading conveyors which are centrally located within the warehouse. Overhead cranes, spanning storage bays of the warehouse, pick up the stacked articles from the intermediate conveyors and deposit them at designated zones in the warehouse bays proper. When articles are to be delivered, the same overhead cranes are directed to the selected zones in the warehouse bays, a stack of articles is lifted clear, and the cranes redeposit the articles on the intermediate unloading and storage conveyors. Here the articles are unstacked and deposited upon a discharge conveyor whereupon they are conducted to the shipping or loading station of the warehouse. It is contemplated that for automatic operation the articles can be coded as they are brought into the system, and an automatic code reader and article diverter system can be installed at the loading or shipping zone of the warehouse.

The manner in which these and other objects of the invention may be accomplished will be apparent from the following detailed description of the invention taken in conjunction with the accompanying drawings.

In the drawings:

FIG. 3 is a fragmentary vertical section taken on line 3—3 of FIG. 1 showing one warehouse bay and associated equipment.

FIG. 4 shows a vertical fragmentary section at the shipping or loading station of the warehouse.

FIG. 5 is an elevation of a monorail carrier disposed at one of the intermediate conveyors.

FIG. 6 is a side elevation of the monorail carrier.

FIG. 7 is a fragmentary section taken on line 7—7 of FIG. 5.

FIG. 8 is a front elevation of one of the overhead crane carriages.

FIG. 10 is a plan view thereof.

FIG. 11 is a section through the jaws of the carriage taken on line 11—11 of FIG. 8.

FIG. 12 is a section taken on line 12—12 of FIG. 10.

FIG. 13 is a fragmentary section through one of the unstackers at an intermediate conveyor.

FIG. 14 is a plan of a pair of intermediate conveyors and unstackers.

FIG. 15 is a plan showing the manner in which corner posts support the cartons as they are stacked on the floor of the warehouse.

Figure 1:
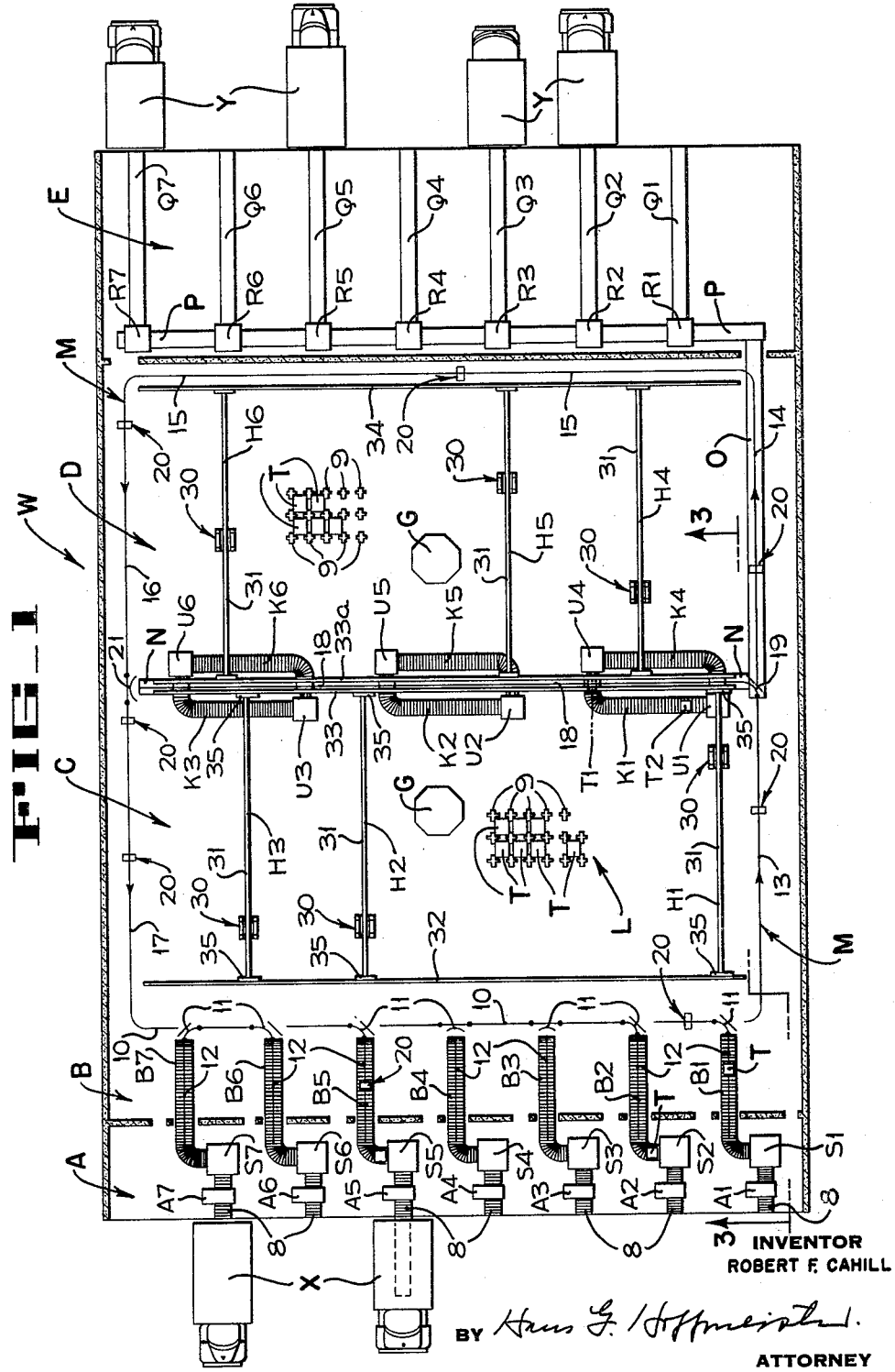
FIG. 1 is a diagrammatic plan view of an automatic warehouse system of the invention.
Figure 2:
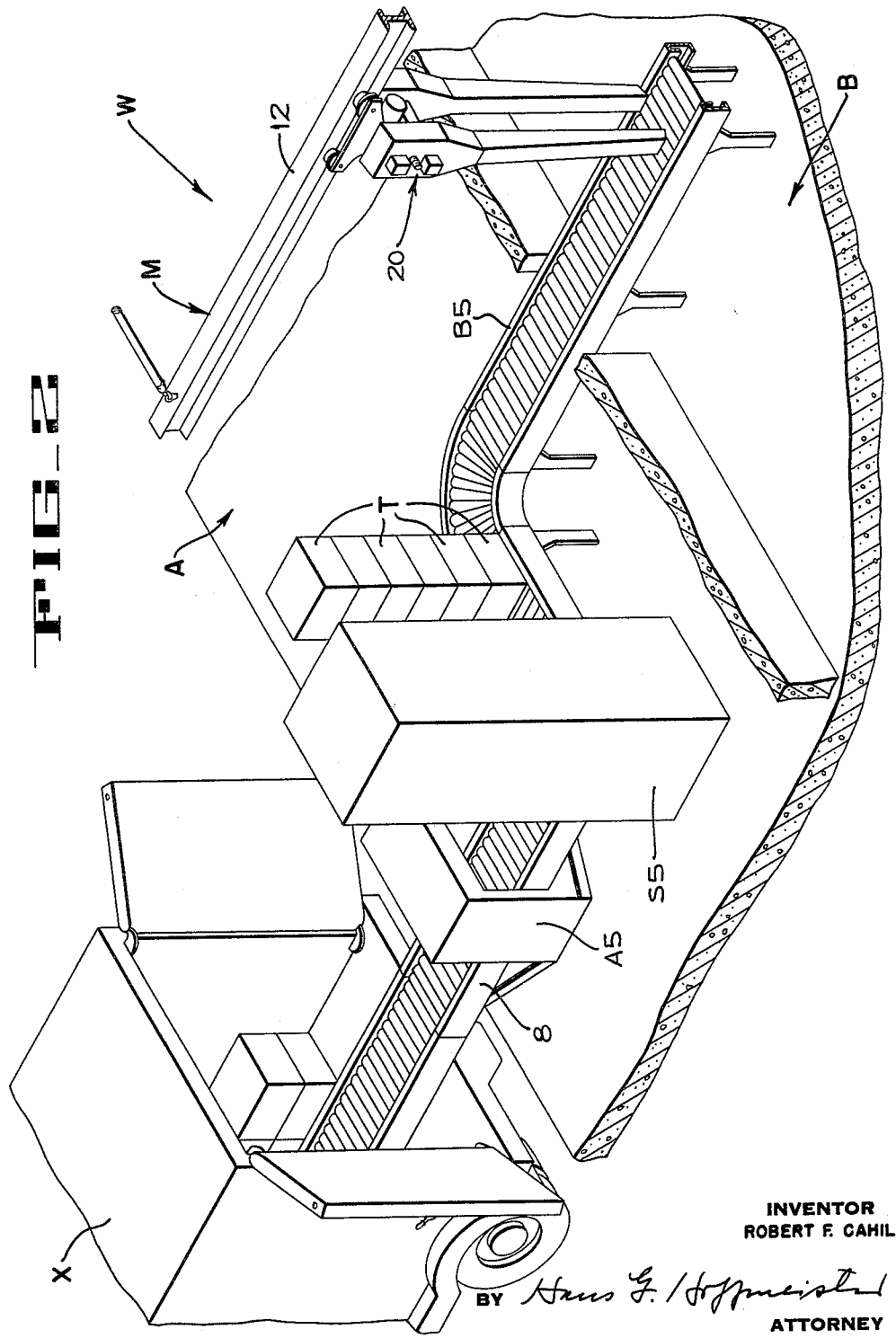
FIG. 2 is a perspective showing the receiving or unloading station.

Referring to FIG. 1 the warehouse W includes a receiving dock or unloading station A, a temporary article storage zone B, a first storage bay C, a second storage bay D, and a loading dock or shipping station E. Boxes, cartons or similar articles are unloaded from incoming trucks X by conveyors 8, and if desired are given suitable code markings by special inks or magnetic means by one of a series of code markers A1 to A7. Individual articles are then stacked by stackers S1 to S7 whereupon they are transferred to any one of a series of temporary storage conveyors B1 to B7. FIG. 2 is a perspective of one of the temporary storage conveyors and associated equipment including an article stacker. The details of the stacking machines S1 to S7 are not part of the invention, such devices being well known in the art. Machines such as that shown in the patent to Verrinder et al, 2,687,813, are suitable for the purposes of the invention.

The stacked articles T are picked up from the temporary storage conveyors B1 to B7 and deposited on combined transfer and unloading conveyors K1-K6, preparatory to the actual storage thereof in the storage bays C and D, by an overhead monorail conveyor system indicated generally at M. This monorail system has a number of legs that extend around the storage bays C and D. There is a leg 10 that runs along the ends of the temporary storage conveyors B1-B7. Monorail switches 11 are provided to connect leg 10 with monorail spurs 12 overlying the storage conveyors B1 to B7 so that the monorail carriages can pick up stacked articles from any of the storage conveyors. A monorail leg 13 is connected to leg 10 and extends along one side of the storage bay C. Another leg 14 extends along the same side of storage bay D. A leg 15 connects to leg 14 of the monorail system and extends along the shipping end of the warehouse, leg 15 connecting to a leg 16 that extends along the other side of storage bay D. A leg 17 extends along the other side of storage bay C and joins leg 10 at the receiving end of the warehouse. An intermediate or transfer leg 18 of the monorail system extends between storage bays C and D. The transfer leg 18 can be connected to leg 13 by a switch 19 and to leg 17 by a switch 21. A number of overhead carriages 20 run on the monorail system. When these carriages are not in use, the switches 11, 19, and 21 are set so that the carriages merely circulate around legs 10, 13, 14, 15, 16 and 17. As mentioned previously, switches 11 can be set to cause the carriages 20 to enter one of the spurs 12 for picking up goods, whereupon the carriage drive is reversed and switches are set to direct the carriages back to the leg 10 in the same direction previously taken on leg 10. If the goods is to be stored in bay C or D, the loaded carriages turn on to leg 13 but switch 19 is now set so that the loaded carriage no longer circulates, but rather enters the intermediate leg 18. The carriage is stopped at one of conveyors K1–K6 and unloaded. The empty carriage is reintroduced into the circulating system by operation of switch 21, that directs it back on to leg 17.

As mentioned, located along the intermediate leg 18 of the monorail system is a series of combined temporary transfer and unloading conveyors K1–K6. Three such conveyors, K1, K2 and K3 serve the storage bay C and three others K4, K5, and K6 serve the storage bay D. The conveyors K1–K3 are associated with unstackers U1–U3, respectively, and conveyors K4–K6 are associated with carton unstackers U4–U6, respectively. The unstackers are only used when articles are being taken out of the warehouse and not when they are being brought into it, as will be explained presently.

In order to transfer stacked articles, such as cartons, from the intermediate transfer and unloading conveyors K1 to K6 to the storage bays, overhead cranes H1–H6 are provided. Cranes H1, H2 and H3 serve storage bay C and transfer incoming articles from conveyors K1, K2 and K3, respectively, to assigned zones in the storage bay C. Overhead cranes H4, H5 and H6 serve storage bay D in a similar manner. The L-shaped configuration of conveyors K1–K6 makes it possible for one leg of the conveyor to receive stacked articles from the monorail, while the other leg, which is parallel to the monorail track, supplies articles to and receives them from, the overhead cranes.

For the purpose of storage, the articles T are deposited in vertical stacks in the storage bays and are prevented from toppling by vertical posts indicated at 9 (FIGS. 1 and 15), the posts being set into holes formed in the floor of the storage bays. The spacing of the posts may vary in different storage areas to accommodate different size cartons or boxes, and each post may have a vertical flange 9A which cooperates with an opposed flange 9A of an adjacent post to separate adjacent stacks of cartons.

The overhead cranes include article transporting carriages 30 traveling on overhead rails or beams 31 which are mounted for traveling movement. These are shown in FIGS. 1 and 3 of the drawings. Referring to FIG. 1, in storage bay C a transverse support beam 32 is disposed adjacent the receiving end of the warehouse and a parallel beam 33 is disposed above and adjacent the leg 18 of the monorail system. The movable beams 31 for overhead cranes H1, H2, and H3 can be moved along the parallel beams 32 and 33 by conventional power driven carriages 35. Similarly, to serve the storage bay D, a beam 33a is mounted adjacent the beam 33 at a point above adjacent the monorail leg 18. A parallel companion beam 34 is disposed at the other end of the warehouse, adjacent the shipping zone.

Movable beams 31 for the overhead cranes H4–H6 run on the tracks or rails provided by beams 33a and 34, thus the entire storage space of bays C and D can be served by cooperation of the monorail system M and the series of overhead cranes H1–H6.

In order to remove selected articles that are picked up from the warehouse storage bays, a discharge conveyor system is provided. Running underneath the leg 18 of the monorail system is a transverse discharge conveyor having a leg N parallel to the intermediate leg 18 of the monorail system. Leg N starts at the unstacker U6 and runs to the zone beneath the monorail switch 19. This conveyor may be power driven and of either a conventional roller or belt construction. A leg O of the discharge conveyor runs along the side of the storage bay D and connects to a leg P which runs along the outside wall of the warehouse at the shipping zone. Joining with the outer leg P of the discharge conveyor, and extending across the shipping dock, are loading storage conveyors Q1–Q7. At the junctions of the leg P of the discharge conveyor and the loading storage conveyors Q1–Q7 are article detector and diverting mechanisms R1–R7 which are provided to read the code on the articles, if such a code has been applied, and direct the articles to the proper truck Y being loaded.

The details of the article detecting and diverting mechanisms R1–R7 are not part of the invention, such devices being well known in the art. A type of detecting device suitable for use in this invention is shown in the patent to Hauschild et al., 2,794,535. Similarly, details of the dispatch system for the monorail carriages and their switches are not part of the invention, such devices being known in the art. Typical devices are shown in the patents to Benson, 2,714,355, and to Quail, 2,688,934.

Major elements of a carriage unit 20 for the monorail system M appear in FIGS. 5 to 7. This unit includes a frame portion 22 that supports an upper cross beam 23. A lower cross beam 23a is supported from cross beam 23 by an arcuate frame extension 22a, as best seen in FIG. 6. Slidably mounted on the vertically spaced cross beams 23 and 23a is a pair of downwardly depending article clamping jaws 24. The carriage is suspended from the legs of the monorail by two front wheels 25 and two rear wheels 25a which are mounted on the upper frame portion 22. One of the wheels 25a is driven by a drive motor 26 through reduction gearing and a belt 26a. The motor receives its power and control signals from trolley lines 26b (FIG. 6) in the conventional manner.

In order to move the jaws 24 toward and away from one another for clamping and releasing stacked articles, a right and left hand threaded screw 27 is threaded into nuts 28 mounted on each arm 24. These screws are driven in either direction by a combined gear reduction and reversible motor assembly 29, rotation of the screws 27 in one direction being effective to cause the arms 24 to approach each other while rotation of the screws in the opposite direction causes the arms to separate. Trolley wires 29a conduct control signals to motor 29.

A carriage assembly 30 suitable for use with the overhead cranes H1–H6 is shown in some detail in FIGS. 8–12. The carriage assembly includes two parallel, laterally spaced cross beams 40 to which end plates 41 are welded. Upper and lower central cross plates 42 are also welded to the beams 40. A motor support bracket 43 is secured to one cross beam and to the upper cross plate 42, for supporting a drive motor 44 for moving the carriage along the overhead rail 31. The motor 44 drives wheel 45 by means of a chain 46. Three other non-driven supporting wheels 47, are mounted on the carriage, as seen in FIG. 10, by means of brackets 48.

Figure 9:
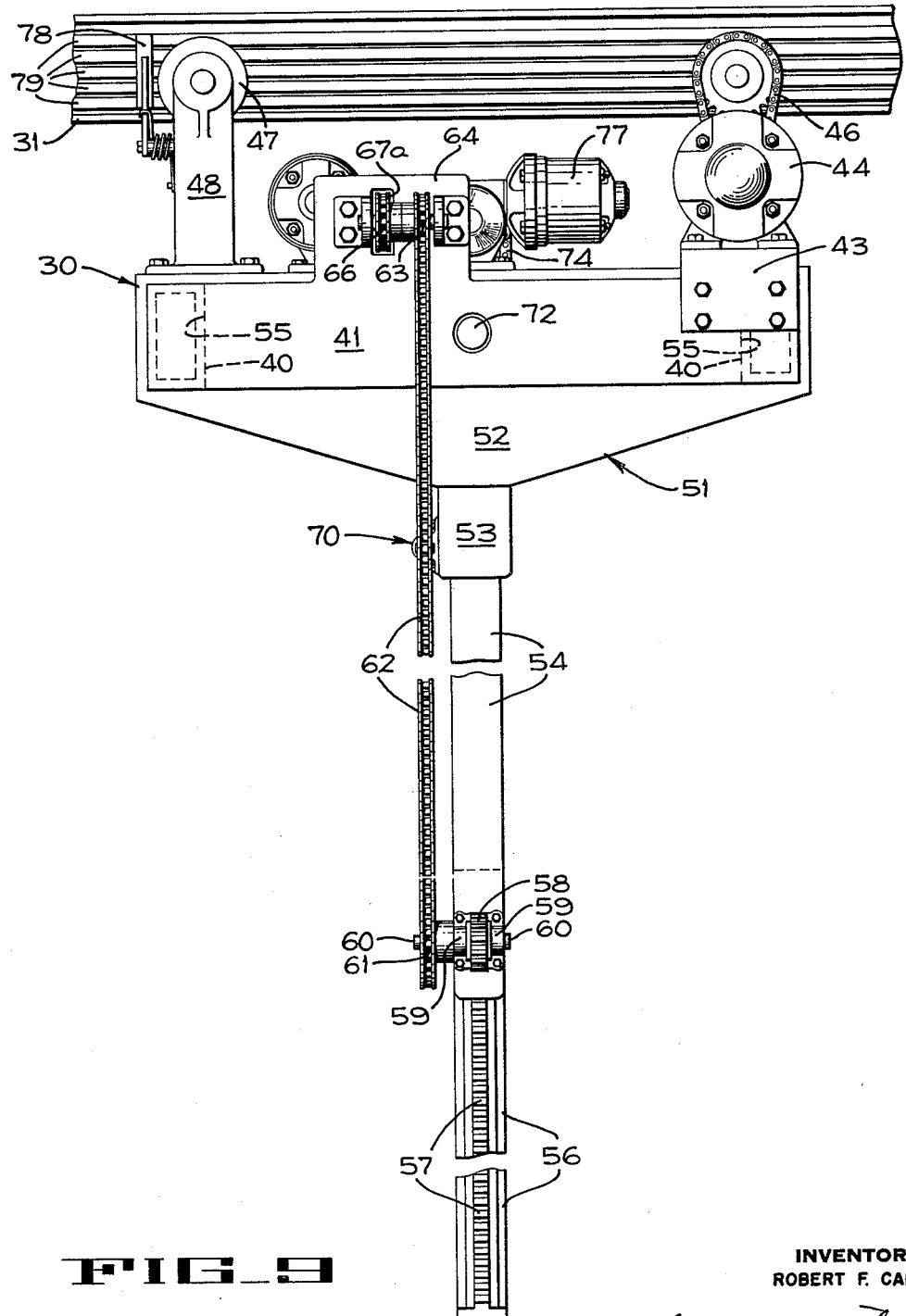
FIG. 9 is a side elevation of the carriage.

The article clamping jaws are mounted on beams 40 by sliding plate assemblies indicated generally at 51. Each assembly includes a pair of gusset plates 52 from which depend central legs 53. Welded to depending legs 53 and extending downwardly therefrom are vertical arms 54. The gusset plates 52 are apertured as at 55, FIGS. 9 and 10, so that they can slide on beams 40. Vertically slidable in depending arms 54 are clamp jaws 56 each of which is formed with racks 57, the racks being driven by pinions 58. As seen in FIGS. 9 and 11, bearings 59 support a shaft 60 on which a rack pinion 58 is secured, and on the other end of shaft 60 is secured a drive sprocket 61, the rotation of which causes projection and retraction of the jaws 56 along the arms 54. Each sprocket 61 is driven by a downwardly extending chain 62 and an upper sprocket 63. Sprockets 63 are mounted on an extension 64 of plate 41. As shown in FIG. 8, the drives for each jaw 56 are substantially identical. As best seen in FIG. 10, one sprocket 66 is driven by a chain 67 which, in turn, is driven by a sprocket 68 connected to a motor and gear reduction shaft that carries sprocket 68 and a sprocket 68a. Sprocket 68a also drives a chain 67a for driving the other sprocket 66 and the associated elements for the other clamp jaw. A spring loaded idler assembly 70 is provided for each chain 62 to accommodate slight changes in the center to center distance between sprockets 61 and 63, as the plate assemblies slide on beams 40.

The mechanism for driving the jaws toward and away from each other, in order to clamp and release stacked articles, is best seen in FIG. 12. A pair of right and left hand nuts 71 and 71a are welded between the gusset plates 52 in each jaw assembly 51. A right and left hand screw 72 is threaded into the nuts, and a drive sprocket 73 is keyed to the midportion of the screw. The sprocket 73 is driven by a chain 74 and a sprocket 76 mounted on a motor and gear reduction assembly 77. Trolleys 8 and 78a make contact with trolley wires 79 and 79a, respectively, for supplying power and control signals to the various units involved.

Details of the unstacker units U1 to U6 are not part of the present invention, article unstackers and their step by step controls being known in the material handling art. A suitable unit is shown in the patent to Van Doren, 2,702,132, in which a mechanism is disclosed for removing the lowermost article of a stack of articles after the stack has been moved into engagement with an endless belt type conveyor. In FIGS. 13 and 14 is shown a stack lowering mechanism for depositing a stack of articles on a conveyor that is provided with a pair of spaced endless chains 87. This lowering mechanism includes a vertical box-like housing 80 and an elongated upper opening 81 for receiving a stack of articles deposited on the intermediate transfer and unloading conveyor K1 associated with unit U1. A conveyor unit K4 is also adjacent units K1 and U1 but conveyor K4 serves the unstacker unit U4. Conveyor K4 is broken away in FIG. 13 for clarity. A plateform 83 slides within housing 80 and is mounted on a hydraulic piston 84 which extends from a hydraulic cylinder 86 mounted below the floor level of the warehouse. When the platform 83 is lowered, the stack of articles is deposited on the chains 87 which are provided with article pushers 89 that advance the article through an opening 88 in the housing and onto the conveyor leg N for ultimate delivery to the shipping dock. Conveyor leg N has a deflecting rail 90 and a guide rail 91 for assuring centering of the cartons on the conveyor.

The above mentioned Van Doren unstacking mechanism comprises a pair of lifting mechanisms which are reciprocated vertically by means of power driven eccentric mechanisms. The two lifting mechanisms are disposed on opposite sides of the lower end of the stack. To permit the lowermost article to be carried away by the discharge conveyor, the lifting mechanisms are moved upwardly to a gripping station opposite the article immediately above the lowermost article. When the lifting mechanisms reach the gripping station, they are disposed almost at the end of their upward movement. Accordingly, when they are moved into gripping engagement with the article next above the lowermost article, and upward movement of the lifting mechanisms is continued, the stack will be raised slightly from the lowermost article which will be carried out of the unstacker by the discharge conveyor. When that article has been discharged, the lifting mechanisms are lowered to place the stack on the discharge conveyor. Then the lifting mechanisms are moved out of gripping engagement with the stack, and are elevated to the above-mentioned gripping station for the next cycle of operation.

Referring back to FIG. 1, a control booth G is provided for each of the storage bays C and D, which booth contains remote control devices for directing the operation of the monorail carriages and the monorail switches and the overhead cranes, as well as any other units that are automatically controlled.

Operation

In operation, cartons, boxes or other articles that can be stacked are unloaded from trucks X at the receiving dock by means of conveyors 8. If a code control system is installed, the articles will be identified by code markers A1 to A7 associated with the various unloading conveyors. The articles are formed in stacks by the stacking machine S1 to S7 and are advanced to the temporary unloading dock storage conveyors B1 to B7. To explain the operation of the system, it will be assumed that there is a stack of articles of a certain category that is to be stored at point L (FIG. 1) in storage bay C. The carriages 20 of the monorail system are continuously circulating around storage bays C and D, and under control of the control operator at the control booth G for storage bay C, the proper switch 11 is operated to direct a monorail carriage 20 from leg 10 to spur 12 to the stacked articles T on the temporary storage conveyor B1. After the clamp jaws of the monorail carriage grip the stack of articles T, the switch 11 is set to direct monorail carriage back to leg 10 and hence along the longitudinal monorail leg 13.

Switch 19 is set to direct the carriage from leg 13 along the intermediate leg 18. The carriage is stopped over the combined transfer and unloading conveyor K1 and the stack of articles T is deposited on that conveyor in the zone indicated at T1 (FIG. 1) by broken lines. The stack of articles is then moved along the conveyor K1 to a position such as T2 indicated in FIG. 1, for pickup by the overhead crane H1. In the meantime, the monorail carriage 20, that deposited the stacked articles on the conveyor K1, continues along leg 18 and switch 21 is set to direct it back to leg 17 whereby it again circulates around the storage bays ready for its next assignment. Thus the legs of the monorail that surround the storage bays serve to provide what may be termed a circulating reservoir of monorail carriages.

The storage areas outlined by vertical posts 9 in the storage bays can be considered to have positions assigned in accordance with a system of rectangular coordinates. One of the coordinates is a series of zones spaced along the fixed crane rails 32 and 33 for the overhead cranes in storage bay C, and the other coordinate is a series of zones spaced along movable bridging rails 31 that support the overhead crane carriages 30. To continue the description of the unloading operation, movable rail 31 of the overhead crane H1 is positioned along its rails 32 and 33 in alignment with the articles stacked at point T2, and the carriage 30 is moved along movable rail 31 until it is brought over the stack. The jaws are now operated to clamp the stacked articles whereby the carriage moves to the designated position along rail 31 and the rail 31 moves to its designated position along rails 32 and 33 to bring the carriage and its stack of articles over the point L, the designated storage place for that particular stack of articles. If necessary, the crane jaws 56 can be raised during the transport of the stacked articles to clear other articles stacked in the warehouse bay and to clear vertical posts 9. When the articles are brought over designated storage zone L, the clamp jaws of the overhead crane carriage 30 are projected downwardly to bring the articles either against the floor or against the uppermost article of any stack of articles that might be already present in zone L. The clamp jaws are then opened slightly to release the articles, whereupon they are vertically retracted to clear all adjacent articles, and the crane is then available for another storing operation.

When a designated stack of articles is to be removed from a storage bay and delivered to a truck Y waiting at the shipping dock, the stack of articles is first picked up by one of the overhead cranes. Assume again that the crane H1 is called into service for handling the articles described in this example. The stack of articles will be picked up from their storage zone L in storage bay C and will be conducted by crane H1 to the intermediate transfer and unloading conveyor K1 and deposited on the leg of that conveyor that is parallel to leg 18 of the monorail. The conveyor is then operated to carry the stacked articles into the associated unstacker U1, whereupon the articles are deposited one at a time on the output or discharge conveyor leg N. This conveyor leg joins with discharge conveyor O which carries the articles to the shipping dock and brings them to the transverse shipping dock conveyor P. If the articles have been previously coded, one of the combined article code readers and carton diverters R1–R7 will have received control information, causing it to divert the article to one of the associated loading storage conveyors Q1–Q7 and hence to the truck requesting the same. For example, assume that a truck Y at the shipping dock is to be loaded with the articles in question, the combined code reader and diverter R1 will divert the individual articles to the loading conveyor Q1 whereupon they are placed upon the waiting truck Y.

It will be apparent that the servicing of storage bay D is carried out in the same manner as is that of storage bay C and a detailed description of the servicing of storage bay D is therefore unnecessary.

In accordance with this invention the warehouse facilities can be expanded as desired by the addition of storage bays with intermediate monorail legs between each storage bay and with additional conveyors K and unstackers U disposed along such legs. Each additional storage bay will also have its set of overhead cranes. In the automatic warehouses of this invention, virtually no aisles are required in the storage bays, so that maximum utilization of floor space is attained. Since the carriages 20 for the monorail system and carriages 30 for the overhead crane system lift stacks of articles by clamping them, the spaces between the stacks of articles in the storage bays can be at a minimum, so that there is very little waste space in the storage areas. The degree of automation applied to the system is a mere matter of choice, it depends upon the size and complexity of the system. As the system expands, the use of automation becomes more and more important and requires only that the additional controls and associated wiring be installed, and that additional dispatch systems for the monorail carriages and the overhead cranes, such as those described in the aforementioned patents, be included. It can be seen that the automatic warehouse system in this invention is extremely flexible and adapts itself not only in expansion in size on a modular basis but to various degrees of automatic control.

The invention having thus been described, that which is claimed to be new and desired to be protected by Letters Patent is:

1. An article handling and storage system comprising a warehouse, a receiving station for said warehouse, a temporary storage conveyor for said receiving station, an article code marking station at said receiving station, an article stacker at said storage conveyor, said warehouse having a storage bay, a monorail encircling said storage bay and having a leg adjacent said receiving station and a leg opposite said receiving station, motor driven carriages on said monorail, a stacked article carrier depending from each carriage, a switch in said monorail at said storage conveyor, an article transfer and unloading conveyor in the leg of said monorail opposite said receiving station, an overhead crane having a carriage mounted for serving said storage bay, a stacked article carrier depending from the carriage of said crane, an article unstacker at said transfer and unloading conveyor, a shipping station for said warehouse, and an article discharge conveyor for receiving unstacked articles and conveying them to said shipping station.

2. An article handling and storage system comprising a warehouse, a receiving station for said warehouse, a temporary article storage conveyor for said receiving station, an article code marking station at said receiving station, an article stacker at said storage conveyor, said warehouse having a storage bay, a monorail encircling said storage bay, motor driven carriages on said monorail, a stacked article carrier depending from each carriage, a switch in said monorail at said storage conveyor, an article transfer and unloading conveyor in the leg of said monorail opposite said receiving station, an overhead crane having a carriage mounted for serving said storage bay, a stacked article carrier depending from the carriage of said crane, an article unstacker at said transfer and unloading conveyor, a shipping station for said warehouse, an article discharge conveyor for receiving unstacked articles and conveying them to said shipping station, a plurality of loading conveyors leading from said discharge conveyor, and a combined article code reader and diverter at the junctions of said discharge conveyor and said loading conveyors.

3. An article handling and storage system comprising a warehouse, a receiving station for said warehouse, a temporary article storage conveyor for said receiving station, an article code marking station at said receiving station, an article stacker at said storage conveyor, said warehouse having a storage bay, a monorail encircling said storage bay, motor driven carriages on said monorail, a stacked article carrier depending from each carriage, a switch in said monorail at said storage conveyor, an article transfer and unloading conveyor in the leg of said monorail opposite said receiving station, said transfer and unloading conveyor being elevated above the floor of said warehouse, an overhead crane having a carriage mounted for serving said storage bay, a stacked article carrier depending from the carriage of said crane, an article unstacker at said transfer and unloading conveyor, a shipping station for said warehouse, and an article discharge conveyor for receiving unstacked articles and conveying them to said shipping station.

4. An article handling and storage system comprising a warehouse, a receiving station for said warehouse, a temporary article storage conveyor for said receiving station, an article code marking station at said receiving station, an article stacker at said storage conveyor, said warehouse having a storage bay, a monorail encircling said storage bay, motor driven carriages on said monorail, a stacked article carrier depending from each carriage, a switch in said monorail at said storage conveyor, an article transfer and unloading conveyor in the leg of said monorail opposite said receiving station, an overhead crane having a carriage mounted for serving said storage bay, a stacked article carrier depending from the carriage of said crane, said carrier having vertically telescoping jaws, an article unstacker at said transfer and unloading conveyor, a shipping station for said warehouse, and an article discharge conveyor for receiving unstacked articles and conveying them to said shipping station.

5. An article handling and storage system comprising a warehouse, a receiving station for said warehouse, a temporary article storage conveyor for said receiving station, an article stacker at said storage conveyor, said warehouse having a storage bay, a monorail encircling said storage bay, motor driven carriages on said monorail, a stacked article carrier depending from each carriage, a switch in said monorail at said storage conveyor, an article transfer and unloading conveyor in the leg of said monorail opposite said receiving station, an overhead crane having a carriage mounted for serving said storage bay, a stacked article carrier depending from the carriage of said crane, an article unstacker at said transfer and unloading conveyor, a shipping station for said warehouse, an article discharge conveyor for receiving unstacked articles and conveying them to said shipping station, a plurality of loading conveyors leading from said discharge conveyor, and article diverters at the junctions of said discharge conveyor and said loading conveyors.

6. An article handling and storage system comprising a warehouse, a receiving station for said warehouse, a temporary article storage conveyor for said receiving station, an article stacker at said storage conveyor, said warehouse having a storage bay, a monorail encircling said storage bay, motor driven carriages on said monorail, a stacked article carrier depending from each carriage, a switch in said monorail at said storage conveyor, an article transfer and unloading conveyor in the leg of said monorail opposite said receiving station, said article storage and said transfer and unloading conveyors being elevated above the floor of said warehouse, an overhead crane having a carriage mounted for serving said storage bay, a stacked article carrier depending from the carriage of said crane, an article unstacker at said transfer and unloading conveyor, a shipping station for said warehouse, and an article discharge conveyor for receiving unstacked articles and conveying them to said shipping station.

7. An article handling and storage system comprising a warehouse, a receiving station for said warehouse, a temporary article storage conveyor for said receiving station, an article stacker at said storage conveyor, said warehouse having a storage bay, a monorail encircling said storage bay, motor driven carriages on said monorail, a stacked article carrier depending from each carriage, a switch in said monorail at said storage conveyor, an article transfer and unloading conveyor in the leg of said monorail opposite said receiving station, said article storage and said transfer and unloading conveyors being elevated above the floor of said warehouse, an overhead crane having a carriage mounted for serving said storage bay, a stacked article carrier including vertically moving clamp jaws depending from the carriage of said crane, an article unstacker at said transfer and unloading conveyor, a shipping station for said warehouse, an article discharge conveyor for receiving unstacked articles and conveying them to said shipping station, a plurality of loading conveyors leading from said discharge conveyor and article diverters at the junctions of said discharge conveyor and said loading conveyors.

8. An article handling and storage system comprising a warehouse, a receiving station for said warehouse, a temporary article storage conveyor for said receiving station, an article stacker at said storage conveyor, said warehouse having a storage bay, a monorail encircling said storage bay, motor driven carriages on said monorail, a stacked article carrier depending from each carriage, a switch in said monorail at said storage conveyor, an article transfer and unloading conveyor at the leg of said monorail opposite said receiving station, said article storage and said transfer and unloading conveyors being elevated above the floor of said warehouse, an overhead crane having a carriage mounted for serving said storage bay, a stacked article carrier including vertically movable clamp jaws depending from the carriage of said crane, an article unstacker at said transfer and unloading conveyor, a shipping station for said warehouse, an article discharge conveyor having a reach disposed beneath said monorail leg for receiving unstacked articles, said discharge conveyor including means for conveying articles to said shipping station, a plurality of loading conveyors leading from said discharge conveyor, and article diverters at the junctions of said discharge conveyor and said loading conveyors.

9. An article handling and storage system comprising a warehouse, a receiving station for said warehouse, a temporary article storage conveyor for said receiving station, an article stacker at said storage conveyor, said warehouse having a storage bay, vertical stacked-article corner guide posts in said storage bay, a monorail encircling said storage bay, motor driven carriages on said monorail, a stacked article carrier depending from each carriage, a switch in said monorail at said storage conveyor, an article transfer and unloading conveyor in the leg of said monorail opposite said receiving station, said article storage and said transfer and unloading conveyors being elevated above the floor of said warehouse, an overhead crane having a carriage mounted for serving said storage bay, a stacked article carrier including vertically moving clamp jaws depending from the carriage of said crane, an article unstacker at said transfer and unloading conveyor, a shipping station for said warehouse, an article discharge conveyor for receiving unstacked articles and conveying them to said shipping station, a plurality of loading conveyors leading from said discharge conveyor, and article diverters at the junctions of said discharge conveyor and said loading conveyors.

10. An automatic warehouse system comprising a warehouse having a receiving station on one side, a shipping station on another side, and a plurality of storage bays, a monorail encircling said storage bays, said monorail having a branch for serving said receiving station, said monorail having an auxiliary leg running between adjacent storage bays, motor driven carriages on said monorail, a stacked article carrier depending from each monorail carriage, an article transfer and unloading conveyor along said auxiliary monorail leg, switches for directing said monorail carriages into and out of said auxiliary monorail leg, overhead cranes having carriages mounted for serving said storage bays, a stacked article carrier depending from each crane carriage for moving articles back and forth between said article transfer and unloading conveyor and designated zones in a storage bay, an article discharge conveyor running beneath and parallel to said auxiliary monorail leg for receiving single articles placed on an article transfer and unloading conveyor by an overhead crane, and a conveyor for conducting articles from said article discharge conveyor to said shipping station.

11. An automatic warehouse system comprising a warehouse having a receiving station on one side, a shipping station on another side and a plurality of storage bays, a monorail encircling said storage bays, said monorail having a branch for serving said receiving station and a leg running between adjacent storage bays, motor driven carriages on said monorail, a stacked article carrier depending from each monorail carriage, an article transfer and unloading conveyor along said monorail leg, switches for directing said monorail carriages into and out of said monorail leg, overhead cranes having carriages mounted for serving said storage bays, a stacked article carrier depending from each crane carriage for moving articles back and forth between said article transfer and unloading conveyor and designated zones in a storage bay, said carrier including vertically movable article clamp arms, an article discharge conveyor running beneath and parallel to said monorail leg for receiving single articles placed on an article transfer and unloading conveyor by an overhead crane, and a conveyor for conducting articles from said article discharge conveyor to said shipping station.

12. An automatic warehouse system comprising a warehouse having a receiving station on one side, a shipping station on another side and a plurality of storage bays, a monorail encircling said storage bays, said monorail having a branch for serving said receiving station and a leg running between adjacent storage bays, motor driven carriages on said monorail, a stacked article carrier depending from each monorail carriage, an L-shaped article transfer and unloading conveyor disposed along and crossing said monorail leg, a stacked article unstacker serving one leg of said L-shaped conveyor, switches for directing said monorail carriages into and out of said monorail leg, overhead cranes having carriages mounted for serving said storage bays, a stacked article carrier depending from each crane carriage for moving articles back and forth between said article transfer and unloading conveyor and designated zones in a storage bay, said carrier including vertically movable article clamping arms, a carton discharge conveyor running beneath and parallel to each monorail leg for receiving single articles from said unstacker, and a conveyor for conducting articles from said article discharge conveyor to said shipping station.

13. An article handling and storage system comprising a warehouse, a receiving station for said warehouse, a temporary article storage conveyor for said receiving station, said warehouse having a storage bay, a monorail encircling said storage bay, motor driven carriages on said monorail, a stacked article carrier depending from each carriage, a switch in said monorail at said storage conveyor, an article transfer and unloading conveyor in the leg of said monorail opposite said receiving station, an overhead crane having a carriage mounted for serving said transfer and unloading conveyor and said storage bay, stacked article clamping jaws depending from the carriage of said crane, said jaws being vertically movable so that stacked articles carried thereby clear articles stored in said storage bay, a shipping station for said warehouse, and an article discharge conveyor for receiving unstacked articles from said transfer and unloading conveyor and conveying them to said shipping station.

14. An article handling and storage system comprising a warehouse, a receiving station for said warehouse, a temporary article storage conveyor for said receiving station, said warehouse having a storage bay, a plurality of vertical posts in said storage bay for supporting stacked articles at their corners, a monorail encircling said storage area, motor driven carriages on said monorail, a stacked article carrier depending from each carriage, a switch in said monorail at said storage conveyor, an article transfer and unloading conveyor in the leg of said monorail opposite said receiving station, an overhead crane having a carriage mounted for serving said transfer and unloading conveyor and said storage bay, stacked article clamping jaws depending from the carriage of said crane, said jaws being vertically movable so that stacked articles carried thereby clear articles stored in said storage bay, a shipping station for said warehouse, and an article discharge conveyor for receiving unstacked articles from said transfer and unloading conveyor and conveying them to said shipping station.

15. An article handling and storage system comprising a warehouse, a receiving station for said warehouse, a temporary article storage conveyor for said receiving station, said warehouse having a storage bay, a monorail encircling said storage bay and having a leg disposed on the opposite side of said bay from said receiving station, motor driven carriages on said monorail, a stacked article carrier depending from each carriage, a switch in said monorail at said storage conveyor, a generally L-shaped article transfer and unloading conveyor in the leg of said monorail, one leg of said L-shaped conveyor crossing said monorail leg and the other leg of said L-shaped conveyor running parallel to said monorail leg, an overhead crane having a carriage mounted for serving said other leg of said transfer and unloading conveyor and said storage bay, stacked article clamping jaws depending from the carriage of said crane, said jaws being vertically movable so that stacked articles carried thereby clear articles stored in said storage bay, a shipping station for said warehouse, and an article discharge conveyor for receiving unstacked articles from said transfer and unloading conveyor and conveying them to said shipping station.

References Cited in the file of this patent

UNITED STATES PATENTS

| | | |
|---|---|---|
| 536,910 | Berg | Apr. 2, 1895 |
| 897,971 | Fordyce | Sept. 8, 1908 |
| 1,369,393 | Burgess | Feb. 22, 1921 |
| 2,696,920 | Anjeskey | Dec. 14, 1954 |
| 3,027,023 | McGrath | Mar. 27, 1962 |